US005212526A

United States Patent [19]

Domoto et al.

[11] Patent Number: 5,212,526

[45] Date of Patent: May 18, 1993

[54] PROCESS AND APPARATUS FOR TRANSFERRING AND FUSING AN IMAGE TO A RECORDING MEDIUM

[75] Inventors: Gerald A. Domoto, Briar Cliff Manor; Elias Panides, Whitestone, both of N.Y.

[73] Assignee: Xerox Corporation, Stamford, Conn.

[21] Appl. No.: 799,253

[22] Filed: Nov. 27, 1991

[51] Int. Cl.[5] .................... G03B 13/14; G03B 13/20; G03B 15/14; G03B 15/20

[52] U.S. Cl. .................... 355/271; 355/282; 430/124; 430/126

[58] Field of Search .................... 355/271, 273, 277-281, 355/293, 294; 430/97, 124, 126

[56] References Cited

U.S. PATENT DOCUMENTS 3,083,117 3/1963 Sehmiedel et al. .................... 430/126 X
3,734,724 5/1973 York .................... 430/124 X
3,861,911 1/1975 Luebbe, Jr. .................... 430/124 X
4,303,924 12/1981 Young, Jr. .
4,435,069 3/1984 Sato .
4,599,293 7/1986 Eckell et al. .................... 430/126
4,812,383 3/1989 Foote .................... 430/126

*Primary Examiner*—Joan H. Pendegrass
*Attorney, Agent, or Firm*—Finnegan, Henderson, Farabow, Garrett & Dunner

[57] ABSTRACT

In an imaging process, a toned image layer on an image receptor is simultaneously transferred and fused to a recording medium. A radiation curable material is incorporated in the toned image layer such that when the toned image layer is irradiated, the radiation curable material is cured. The resulting cured material has greater adhesion to the toner material and the recording medium than to the surface of the image receptor. The apparatus for performing the above process is also disclosed.

27 Claims, 2 Drawing Sheets

PROCESS AND APPARATUS FOR TRANSFERRING AND FUSING AN IMAGE TO A RECORDING MEDIUM

FIELD OF THE INVENTION

This invention relates in general to an imaging process and apparatus and specifically to the transferring and fusing of an image to a recording medium. More particularly, this invention relates to a method and apparatus for employing a radiation-curable material to simultaneously transfer and fuse a toned image layer from the surface of an image receptor to a recording medium.

BACKGROUND OF THE INVENTION

This invention is directed to transferring and fusing a toned image layer from an image receptor to a recording medium, such as paper. Toned image layers are images formed by a finely divided marking material referred to in the imaging art as "toner."

Several known processes are available for forming the toned image layer. For example, in xerography a uniform electrostatic charge is placed on a photoconductive insulating layer in the dark. The electrostatically charged surface is then selectively exposed to a light and shadow image to form a latent image thereon. Examples of electrostatic formation of latent images are disclosed in U.S. Pat. Nos. 4,408,214, 4,365,549, 4,267,556, 4,160,257, and 4,155,093. The resulting latent electrostatic image is developed to provide a visible reproduction of an original by depositing toner on the latent image. Toner is principally attracted to those areas of the photoconductive layer which retain a polarity of charge opposite to the polarity of charge on the toner particles, thereby forming a visible toned image layer corresponding to the electrostatic latent image.

Alternatively, a toned image layer may be formed by an ionographic imaging process. In an ionographic imaging process, a latent image is formed on a dielectric image receptor or electroreceptor by ion deposition, as described, for example, in U.S. Pat. Nos. 3,564,556, 3,611,419, 4,240,084, 4,569,584, 4,408,214, 4,365,549, 4,267,556, 4,160,257, and 4,155,093. Generally, the ionographic process entails application of charge in an image pattern with an ionographic writing head to a dielectric receiver that retains the charged image. The image is subsequently developed with a developer capable of developing charge images.

The toned image layer may then undergo further processing and, finally, be transferred to a recording medium, such as paper. The transferred image may then be permanently affixed, or fused, to the recording medium by various conventional fixing methods, such as the application of heat or pressure or use of a solvent.

The toner used for such processes are generally composed of a thermoplastic resin and a colorant, such as a dye or pigment. Examples of suitable resins are disclosed in U.S. Pat. No. 4,476,210, and examples of suitable colorants are disclosed in U.S. Pat. Nos. 4,476,210, 4,464,252, 4,480,021, 4,794,651, 4,762,764, 3,729,419, 3,841,893, and 3,968,044.

Additionally, the toner may be used in combination with a suitable carrier, and additives such as a charge control agent, pigments, a flow improver or the like. Various toner compositions are disclosed in U.S. Pat. Nos. 4,659,640, 4,476,210, 4,794,651, 4,762,764, 3,729,419, 3,841,893, and 3,968,044.

Toners are generally manufactured by a process in which the colorant is uniformly dispersed in the resin by heating and blending the toner ingredients in a suitable mill. After cooling, the blended mixture is then pulverized to form it into finely divided particles within the desired size range.

Toners may be in a dry or liquid form. For example, toner may be in the form of a dry powder, such as is used in xerographic copying. Alternatively, the toner may be in the form of an electrostatic liquid ink wherein the toner particles are dispersed in a liquid carrier, such as is used in electrographic type printers.

Imaging processes may be used to develop black and white, single color, or multi-color images. Multi-color imaging may be done either as a fully formed image or a step formed image. A fully formed image implies that an image with multiple colors is fully formed on the image receptor and then transferred to the recording medium in a single step. In a step formed image the colored toner images are individually formed on the image recorder and transferred to the recording medium one color at a time. Processes for forming monochromatic or polychromatic electrostatic images are disclosed, for example, in U.S. Pat. Nos. 3,672,887, 3,687,661, 4,395,472, 4,353,970, 4,403,848, and 4,286,031.

Previously, methods have been proposed for developing the toned image layer on an image receptor, transferring the toned image layer to a recording medium, and subsequently fusing the toned image layer to a recording medium, such as paper. One such method employs a dry powder type of pressure fixable toner to form the toned image which is transferred from a photoreceptor to a paper recording medium and subsequently affixed thereto by use of a cold roller with high nip pressure. Such pressure-type image transfusion is employed in commercial printers sold by Delphax Co.

Another method for developing, transferring, and fusing a toned image involves a thermal-type system wherein a toner image is formed on a photoreceptor with a thermally fixable toner. The toned image is transferred from the photoreceptor to a paper recording medium and subsequently affixed thereto by the application of heat.

One apparatus for such thermal fixing is disclosed in U.S. Pat. No. 4,435,069, wherein an infrared radiation heat source is used to fix an image. A backing roller transports a recording sheet to a fixing drum having an infrared radiation heat source in its interior. A toner image on the recording sheet is permanently fused to the sheet when contacted with heat permeated from a heat-absorbing area of the drum.

In another example of toner image development, U.S. Pat. No. 4,303,924, discloses a jet drop printing process wherein a radiation curable ink is first jetted onto a recording sheet and then cured by irradiation with, e.g., ultraviolet radiation energy.

There has not been developed, however, a simplified one-step method of simultaneously transferring and fusing (hereinafter referred to the combined step of transferring and fusing as "transfusing") an image from an image receptor to a recording medium.

SUMMARY OF THE INVENTION

The present invention satisfies a need for a method and apparatus for simultaneously transferring and fusing an image from an image receptor to a recording medium.

The present invention provides a method of transferring an image from an image receptor to a recording medium, which method comprises forming a toned image layer on a surface of an image receptor, the toned image layer comprising a toner material and a radiation curable material; contacting a recording medium with the toned image layer; and irradiating the toned image layer in contact with the recording medium to cura said radiation curable material; wherein the resulting cured material has greater adhesion to the toner material and the recording medium than to the surface of the image receptor. The radiation may be transmitted through the image receptor and onto the toned image layer to cure the radiation curable material.

BRIEF DESCRIPTION OF THE DRAWINGS

The present invention will be described herein below with reference to the accompanying drawings wherein.

DETAILED DESCRIPTION OF A PREFERRED EMBODIMENT OF THE INVENTION

Figure 1:
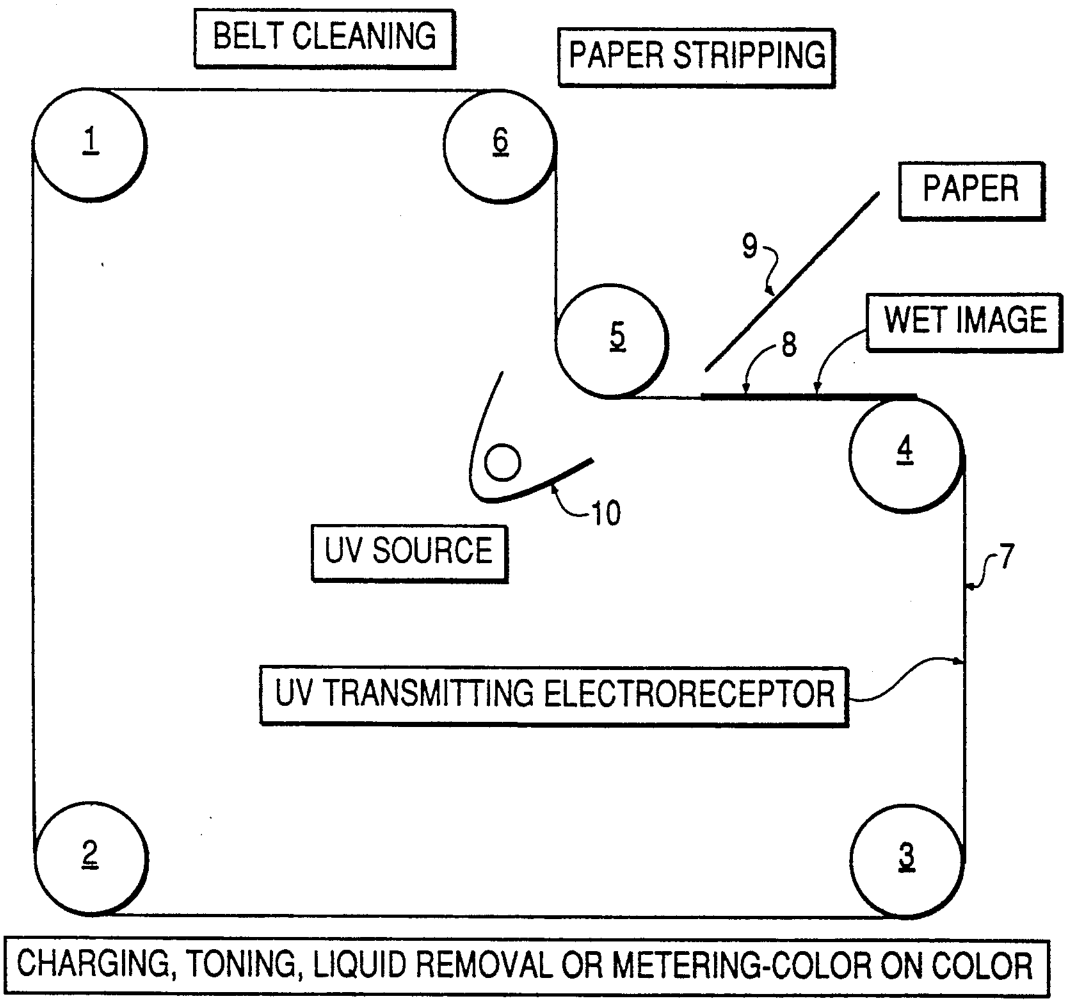
FIG. 1 illustrates schematically a preferred embodiment of a machine configuration suitable for use in the present invention, and, FIG. 2 illustrates schematically a preferred embodiment of the area of the machine of FIG. 1 of the present invention where a toner image is simultaneously transferred and fused from a moving image receptor to a recording medium.

In carrying out the objectives of the present invention, a method and apparatus are described herein which simultaneously transfer and fuse an image from an image receptor to a recording medium.

In one preferred embodiment, the method of transferring an image from an image receptor to a recording medium comprises forming a toned image layer on a surface of an image receptor, the toned image layer comprising a toner material and a radiation curable material; contacting a recording medium with the toned image layer; and irradiating the toned image layer in contact with the recording medium to cure said radiation curable material; wherein the resulting cured material has greater adhesion to the toner material and the recording medium than to the surface of the image receptor. The radiation may be transmitted through the image receptor and onto the toned image layer to cure the radiation curable material.

The toner image may be formed on the image receptor using a dry toner, wherein the radiation curable material is applied to the dry toner image to form the toned image layer. Alternatively, the toner image is formed on the image receptor using a liquid toner wherein the radiation-curable material is applied to the liquid toner image to form the toned image layer. The toned image layer may also be formed using a liquid toner containing the radiation-curable material. The radiation curable material may be cured by any appropriate radiation, such as ultraviolet radiation, infrared radiation, or visible light.

The toned image layer may be formed on the surface of the image receptor by contacting the image receptor with a surface supporting the toned image layer, such as a photoreceptor. Alternatively, the toned image layer may be formed by depositing a latent image directly on the image receptor by ionography and developing the image with toner.

The image receptor is made of a dielectric material which may comprise a material from the group consisting of an acrylic resin, a polycarbonate resin, Mylar, and a transparency material. The image receptor may also comprise a ground plane of a material such as aluminum, titanium, or chromium. The recording medium may comprise paper, metal, plastic, or glass. Furthermore, the recording medium may be modified, such as by roughening the surface or post-processing.

The present invention may be used to make black-and-white, single color, or multi-color images. A multi-color image may be produced wherein the toned image layer is fully formed on the image receptor before transferring the toned image layer to the recording medium. Alternatively, a multi-color image may be produced wherein each color is separately transferred from the image receptor to the recording medium. In such a process, a color layer may be at least partially cured before the next successive color transfer.

In another preferred embodiment, the apparatus for transferring and fusing a toned image layer from an image receptor to a recording medium comprises an image receptor comprising a component transparent to radiation for curing a radiation-curable material; a means for contacting a recording medium with the image receptor to at least partially transfer a toned image layer from the image receptor to the recording material, wherein the toned image layer comprises a toner material and a radiation-curable material, and a source of radiation for curing the radiation curable material positioned to cure the radiation curable material as the image receptor contacts the recording medium.

The image receptor may be in the form of a web, a belt, a drum, a plate or a sheet. The image receptor should be a reasonably good dielectric material. The image receptor may optionally have a ground plane. The image receptor must be at least partially transparent to the curing radiation. The dielectric material of the image receptor may comprise a material selected from the group consisting of a polyester resin, an acrylic resin, Mylar, and a transparency material similar to that used by Versatec. The material of the ground plane may comprise a material selected from the group consisting of aluminum, titanium, and chromium, and a salt based material such as those employed by Versatec.

The source of radiation may be selected from the group consisting of visible light, ultraviolet radiation, and infrared radiation. The radiation source may be oriented to at least partially cure the toned image layer on the image receptor before it contacts the recording medium.

Illustrated in FIG. 1 is a schematic representation of a preferred embodiment of a possible machine configuration suitable for use in the present invention. The image receptor 7 is in the form of a belt. The material of the image receptor belt is transparent to the radiation for curing the radiation curable material within the toned image layer. The image receptor belt 7 is moved around tensioning rollers 1, 2, 3, 4, 5, and 6. The belt moves around the tension rollers in the direction of arrow 11. Between rollers 1 and 3 a toned image layer is formed on the image receptor belt 7.

The toned image layer may be formed by any known method compatible with the system. In one preferred embodiment, the toned image layer is formed by xerography. In xerography, an electrostatic charge is applied to the image receptor which selectively exposes the layer to form a latent image as in a conventional xerographic machine. The visible image is then developed by use of a toner, which may be mixed with curable polymers, pigments, charge control agents and other additives. When the toner is applied to the electrostatic latent image, the toner is normally attracted to those areas of the image layer which retain a charge, thereby forming a visible toned image corresponding the electrostatic latent image.

In another preferred embodiment the toned image layer is formed by ionography. In an ionographic imaging process, a latent image is formed directly on the image receptor by application of charge in an image pattern with an ionographic writing head to the image receptor. The image is subsequently developed with a toner capable of developing charge images.

Alternatively, in another preferred embodiment, the toned image layer is formed on the image receptor by contacting the image receptor with a surface, such as a photoreceptor, which is supporting the toned image layer.

A radiation curable material is added to the toner which forms the toned image layer. The radiation curable material may be admixed with the toner material before applying the toner to the image receptor. Alternatively, the radiation-curable material may be applied to a toner image on the image receptor to form the toned image layer.

The toned image layer is then moved around tensioning roller 4 to approach and contact the recording medium which is moving in the direction of arrow 12. The toned image layer is then exposed to radiation from a radiation source 10 emitting a level of radiation capable of curing the polymer which hardens upon exposure to the radiation. The radiation may be in the form of visible light, infrared radiation, or ultraviolet light. Simultaneously, the image receptor is contacted with a recording medium 9 to transfer the image onto the recording medium.

Figure 2:
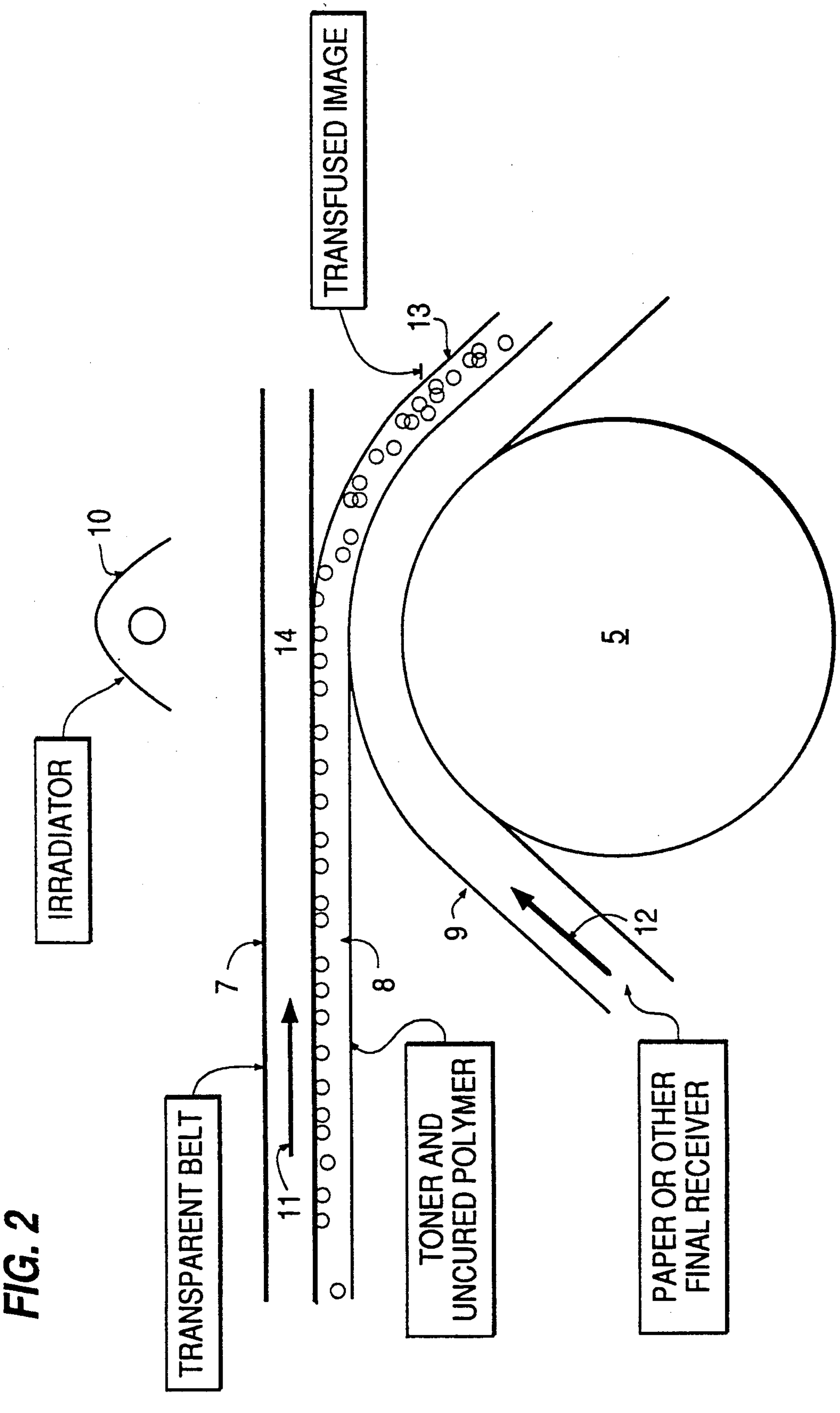

FIG. 2 schematically illustrates the area of the machine suitable for the processes of the present invention where the toned image layer is simultaneously transferred from the image receptor to the recording medium and fused to the recording medium. The toned image layer, which is carried on the image receptor belt 7, and the recording medium 9 are transported toward a common point 14 on tensioning roller 5 as indicated by arrows 11 and 12. When the toned image layer on the image receptor contacts the recording medium, e.g., a sheet of paper, the toned image layer is transferred from the image receptor 7 to the recording medium 9.

Simultaneously, the toned image layer fuses to the recording medium when the curable material is exposed to the curing radiation. The radiation transmitting portion of the image receptor is transparent to the radiation so the curing radiation passes through the belt and acts on the radiation curable material in the toned image layer which is now in contact with the recording medium. Upon exposure to the curing radiation, the radiation curable material at least partially or fully hardens and fuses to the recording medium.

The radiation source may be, depending on the radiation curable material, a visible light source, an infrared radiation source, or an ultraviolet light source. The radiation source is positioned behind the image receptor area which contacts the recording medium.

For example, a medium pressure mercury lamp may be used as an ultraviolet light source. A Hanovia lamp, approximately 1 foot long, may be contained in an elliptical housing which focuses the radiation to a narrow beam of ¼ inch width on the image receptor surface.

Generally, the required radiation dosage is about 7–20 joules/sq. inch at a recording medium feed rate of 20–60 inches/ second. The radiation requirements and image processing rates depend on the concentration and type of photoinitiator, layer thickness, substrate, and radiation curable material.

The radiation source may also be positioned to control the spacial distribution of the radiation source into the region before the contact zone to expose the toned image layer to the curing radiation before the image receptor contacts the recording medium. By exposing the toned image layer to curing radiation before contacting the recording medium, the toned image layer is at least partially cured before transfer to the recording medium. This curing prior to contact with the recording medium may be used to control the viscosity of the toned image layer. Alternatively, the toned image layer may be dried by air-knife before curing.

After the simultaneous transfer and fusing of the image to the recording medium, the paths of the moving image recorder and recording medium then separate between tensioning rollers 5 and 6. The image receptor belt is then cleaned between tensioning rollers 6 and 1 for further processing. The transfused image will have the surface finish of the recording medium. The surface may be treated further or modified, for example, by roughening the recording medium's surface.

The present invention may be used for black and white, single color or multi-color printing. Multi-color printing may be done either as a fully formed image or a step formed image. Fully formed image implies that an image with multiple colors is fully formed on the image receptor and then transferred in a single step. On the other hand, a step formed image implies that the colored toner images are individually formed on the image recorder and transferred to the recording medium one color at a time.

In one embodiment of the present invention a multicolor image is formed on a recording medium in which a first latent image may be formed on the image receptor and developed with a developer of a first color, followed by formation of a second latent image on the image receptor and developed with a developer of a second color, and, if desired, followed by subsequent image formation and development steps to form an image of the desired number of colors, followed by simultaneous transfer and fusing of the thus fully formed image to the recording medium. The colored layers may be at least partially cured before the next successive color transfer to increase the latitude of adhesion requirements of the toners.

Alternatively, in another embodiment of the present invention a multi-color image is formed on a recording medium whereby a fully formed image is transferred to the image receptor from another surface, such as a photoreceptor, followed by simultaneous transfer and fusing of the thus fully formed image to the recording medium.

In another embodiment of the present invention a multicolored image is formed on a recording medium whereby a first latent image may be formed on the image receptor and developed with a developer of a first color, followed by simultaneous transfer and fusing the colored image to the recording medium. Then, a second latent image may be formed on the image receptor and developed with a developer of a second color, followed by a second simultaneous transfer and fusing of the colored image to the recording medium. Subsequent image formation and development steps to form an image followed by simultaneous transfer and fusing to the recording medium may be performed to achieve the desired number of colors in the thus step formed image on the recording medium.

Alternatively, in another embodiment of the present invention a multi-colored image is formed on a recording medium whereby a first toned image layer of a first color is transferred to the image layer from another surface, such as a photoreceptor, and then simultaneously transferred and fused to the recording medium. Then, a second toned image layer of a second color is transferred to the image layer from another surface, and subsequently the toned image layer on the image receptor is simultaneously transferred and fused to the recording medium. Subsequent image transfer to the image receptor from another surface, and simultaneous transfer and fusing to the recording medium may be performed to achieve the desired number of colors in the thus step formed image on the recording medium.

Any available toner may be used with the present invention that is compatible with the radiation curable material and the irradiation process. Since the toners are eventually combined with a material which must be cured by irradiation, the toner must be selected to be sufficiently transparent to the curing irradiation to allow the material to harden. Also, to insure a proper transfer, the toner must have a higher affinity for the radiation curable material and the recording medium than it has for the image receptor. The radiation cured toned image layer should also have the proper surface energy characteristics in the hardened state.

The toners suitable for forming the image in the present invention can be either the dry powders type toner or liquid ink type toner. A dry toner may be a dry powder electrophotographic toner as used in xerographic copiers and printers. A liquid toner may be formed from an electrostatic liquid ink as used in Versatec printers.

Generally, a toner particle is composed or a resin and a colorant. The resin may consist of a styrene type resin, a vinyl type resin, a rosin-modified resin, an acrylic type resin, a polyamide type resin, an epoxy resin, a polyester resin, and the like.

The toner may contain any colorant compatible with the process. The coloring may be provided by pigment particles, or may comprise a resin and a pigment; a resin and a dye or a resin, a pigment, and a dye. Suitable resins include poly(ethyl acrylate-co-vinyl pyrrolidone), poly(N-vinyl-2-pyrrolidone), and the like. Suitable dyes include Orasol Blue 2GLN, Red G, Yellow 2GLN, Blue GN, Blue BLN, Black CN, Brown CR, all available from Ciba-Geigy, Inc., Mississauga. Ontario. Morfast Blue 100, Red 101, Red 104, Yellow 102, Black 101, Black 103, all available from Morton Chemical Company, Ajax, Ontario, Bismark Brown R (Aldrich), Neolan Blue (Ciba-Geigy), Savinyl Yellow RLS, Black RLS, Red 3GLS, Pink GBLS, all available from Sandoz Company, Mississauga, Ontario, and the like. Dyes generally are present in an amount of from about 5 to about 30 percent by weight of the toner particle, although other amounts may be present provided that the objectives of the present invention are achieved. Suitable pigment materials include carbon blacks such a Microlith Conn., available from BASF, Printex 140 V, available from Degussa, Raven 5250 and Raven 5720, available from Columbian Chemicals Company.

Suitable pigment materials include magenta pigments such as Hostaperm Pink E (American Hoechst Corporation) and Lithol Scarlet (BASF), yellow pigments such as Diarylike Yellow (Dominion Color Company), cyan pigments such as Sudan Blue OS (BASF), and the like. Generally, any pigment is suitable provided that is consists of small particles and that it combines well with any polymeric material also included in the developer composition. Pigment particles are generally present in amounts of from about 5 to about 40 percent by weight of the toner particles, and preferably from about 10 to about 30 percent by weight. The toner particles should have an average particle diameter from about 0.2 to about 10 microns, and preferably from about 0.5 to about 2 microns. The toner particles may be present in amounts of from about 1 to about 10, and preferably from about 2 to about 4 percent by weight of the developer composition.

Liquid toners consist of a charged toner particle dispersed in a hydrocarbon carrier. Any of several hydrocarbon liquids may be used which are conventionally employed for liquid development processes, including high purity alkanes having from about 6 to about 14 carbon atoms, such as Norpar 12, Norpar 13, Norpar 15, available from Exxon Corporation, and including isoparaffinic hydrocarbons such as Isopar G,H,L, and M, available from Exxon Corporation, Amsco 460 Solvent, Amsco OMS, available from American Mineral spirits Company, Soltrol, available from Phillips Petroleum company, Pagasol, available from Mobil Oil Corporation, Shellsol, available from Shell Oil Company, and the like.

The radiation curable material may be selected from any of those known in the art which are compatible with toner image transferring and fusing process. The radiation-curable material may be a monomer or prepolymer or mixtures thereof which are polymerizable by irradiation. Irradiation may be, for example, in the form of ultraviolet, visible or infrared ratiation.

Suitable radiation curable materials for incorporation into toners are disclosed in U.S. Pat. Nos. 4,056,453, 4,026,949, 3,804,736, and 3,803,109, the disclosures of each of which are totally incorporated herein by reference. Among the radiation curable materials which may be used are the polyfunctional terminally unsaturated organic compounds including the polyesters of ethylenically unsaturated acids such as acrylic acid and methacrylic acid and a polyhydric alcohol. Examples of some of these polyfunctional compounds are the polyacrylates and polymethacrylates of trimethylolpropane, pentaerythritol, dipentaerythritol, ethylene glycol, triethylene glycol, propylene glycol, glycerin, sorbitol, neopentylglycol, 1,6-hexanediol and hydroxyterminated polyesters, hydroxy-terminated epoxy resins, and hydroxy-terminated polyurethanes. Also included in this group of terminally unsaturated organic compounds are polyallyl and polyvinyl compounds such as diallyl phthalate and tetraalyloxyethane and divinyl adipate, butane divinyl ether and divinylbenzene.

Another group of radiation curable compounds are polyfunctional ethylenically unsaturated compounds that are not terminally unsaturated, but these materials tend to be less reactive than the terminally unsaturated compounds.

In addition to the multifunctional ethylenically unsaturated material, a monofunctional one may also be used for the radiation curable material. Thus, 0–90% by weight of a monofunctional ethylenically unsaturated material may be added for viscosity control, cured film flexibility and bond strength. A preferred group of such radiation curable compounds are the terminally unsaturated organic compounds containing one terminal ethylenic group per molecule. Examples of such mcnofunctional compounds are the $C_2$ to $C_{16}$ alcohol esters of acrylic and methacrylic acid, styrene, and substituted styrenes, vinyl esters such as vinyl acetate, vinyl ethers and N-vinyl 2-pyrrolidone. In general, these compounds are liquid and have lower viscosity than the polyfunctional compounds and thus can be used to reduce the viscosity of the coating composition. In a preferred embodiment, the radiation curable material is "Magnacryl" which is commercially available from Beacon Chemical. Other UV or visible light curable materials may be obtained from Loctite.

The radiation curable material may be either incorporated in to the toner before forming the visible image or it may be applied to the formed toner image in a separate step. In the case where a dry toner is used, the dry powder is first applied to the image receptor to form the visible image, and subsequently the radiation curable material is applied to the toner image to form the wet toned image layer.

In the case where a liquid toner is used, the radiation curable material may be added to the liquid ink toner before the toner is applied to the image receptor or the radiation curable material may be applied to the toner image after the toner is applied to the image receptor.

To insure good transfer and fusing of the toner image, the radiation curable material must have good adhesion characteristics with regard to the toner and final recording medium and relatively poor adhesion to the image receptor after curing. Also, the radiation curable material must have surface energy characteristics such that the material wets the image receptor, toner and recording medium.

The radiation curable material will at least partially harden as it is cured by either ultraviolet, infrared or visible light. The radiation curable material upon polymerization becomes a solid and adheres to both toner particles and the recording medium. Preferably the radiation curable material requires no additional thermal energy to accomplish melting of the toner or to cause the melted toner to penetrate the paper fibers. Also, the material preferably requires no additional high pressure to flow into and wet the recording medium fibers and wet the toner particles. Because the process involved a single step for transferring and fusing and requires no additional heat or pressure, the system has lower energy requirements and much less mechanical and thermal stress.

The image receptor may be in the configuration of a web, a belt, a drum, a plate, a sheet and the like. The image receptor should, at least in the area of the toned image layer, be made of a material transparent to the curing radiation. At the point of transfusion, the image receptor 7 is portioned between the radiation source 10 and the recording medium 9. Therefore, to cure the polymer which has transferred with the toned image to the recording medium, the image receptor should allow the radiation to pass through and onto the toned image layer to cure the radiation curable material. The material of the image receptor is basically a good dielectric material. The choice of material is based on how the toned image layer is produced and developed with toner. Additionally, the image receptor must have relatively low adhesion to the toned image layer compared to the recording medium. Generally, the overall thickness of the image receptor is from a few tenths of a millimeter to several centimeters, depending on the support layers and strength requirements.

Examples of dielectric materials suitable for forming the image receptor include Teflon (E.I. Du Pont de Nemours & Company), transparency materials, such as those employed by Versatec, fluorocarbon elastomers, including vinylided fluoride-based fluoroelastomers which contain hexafluoropropylene as a comonomer, such as Viton (E.I. Du Pont de Nemours & Company), polycarbonates such as Lexan and Makrolon, polyesters such as Mylar (E.I. Du Pont de Nemours & Company), mixtures thereof, and the like. The image receptor material may also be of a polyester or acrylic resin.

The dielectric material of the image receptor may further consist of a transparent polymer overcoating containing a charge transport compound. The image receptor may have a ground plane, also transparent to the curing radiation, comprising a thin metallic coating such as aluminum, titanum, chromium, or a salt-based material such as those employed by Versatec. For example, an image receptor belt may consist of an acrylic substrate for strength with an ultraviolet transmitting ground plane of chromium 20 Angstroms thick, and a top layer of acrylic to act as a charge receptor. Alternatively the image receptor may be titanized or aluminized Mylar, generally of a thickness of about one milliinch, titanized or aluminized Kynar, titanized or aluminized Tedlar, titanized or aluminized Makrolon and the like. In a preferred embodiment, a Mylar belt material will sufficiently transmit UV to cure a radiation-curable material, such as Magnacryl polymer and ensure that the adhesion between cured Magnacryl and Mylar is smaller than that between the Magnacryl and the recording medium. The Mylar is aluminized wherein the aluminum coating is in the order of 20 Angstroms thick.

The recording medium may be selected from a material having sufficient adhesion to the toner and curable polymer mixture. Examples of suitable recording medium material are paper, transparency materials, aluminum, brass, plastics, or glass.

A release agent may be added to the toner composition to give the proper surface energy characteristics in the hardened state of the radiation cured material. A release agent may be selected from any available release agent used in developing processes which insures the transfer and fusion of the toner image from the image receptor the recording medium. Examples of such release agents are polyethylene, hydrolyzed polyathylene polymers, polypropylene, paraffin wax, microcrystalline wax, copolymers of ethylene and acrylic acid, and the like.

If the material selected for the toner does not exhibit desirable triboelectric charging characteristics, a charge control agent can be added to the toner material. Examples of suitable charge control agents include lecithin (Fisher Inc.); OLOA 1200, a polyisobutylene succinimide available from Chevron Chemical Company; basic barium petronate (Witco Inc.); zirconium octoate (Nuodex); aluminum stearate; salts of calcium, manganese, magnesium and zinc; heptanoic acid; salts of barium, aluminum, cobalt, manganese, and zinc; heptanoic acid; salts of barium, aluminum, cobalt, manganese, zinc, cerium, and zirconium octoates; salts of barium, aluminum, zinc, copper, lead, and iron with stearic acid; and the like. The charge control additive may be present in an amount of from about 0.01 to about 3 percent by weight, and preferably from about 0.02 to about 0.05 percent by weight of the developer composition.

Additional components may be added to the toner composition such as solvents, stabilizer, photoinitiators, and the like.

EXAMPLE

A device as illustrated in FIGS. 1 and 2 was used to perform the following image transfusing process. The image receptor was a 1 milli-inch Mylar layer with a 20 Angstrom ground plane of aluminum in the configuration of a flexible belt. Paper was used for the recording medium. The ultraviolet radiation source was a 300 watt per inch Hanovia medium pressure mercury lamp. The lamp was approximately 1 foot long and enclosed in an elliptical housing which focused the radiation to a narrow beam of ¼ inch width on the image receptor. The belt tension and UV irradiation spatial distribution were adjusted for minimal disturbance of the image.

Magnacryl, a commercially available UV curing polymer from Beacon Chemical, was applied to a liquid toned image which had been partially dried by air-knife or roll metering. The image receptor with the toner image contacted the paper recording medium and the surfaces were simultaneously exposed to radiation. The ultraviolet source irradiated the paper-image contact zone through the transmitting belt causing the ink to harden and adhere to the paper. Thus, the image transfused to the paper. The transfusion process rate was up to 7 inches per second. The resulting transfused image had the surface finish of the glossy recording medium.

The surface of the image can be altered either by roughening the recording material or by post processing the transfused image.

Other embodiments and modifications of the present invention may occur to those skilled in the art subsequent to a review of the information presented herein; these embodiments and modifications, as well as equivalents thereof, are also included within the scope of this invention.

What is claimed is:

1. The method of transferring an image from an image receptor to a recording medium, which method comprises:

forming a toned image layer on a surface of an image receptor, the toned image layer comprising a toner material and a radiation-curable material;

contacting a recording medium with the toned image layer; and irradiating the toned image layer in contact with the recording medium to cure said radiation curable material;

wherein the resulting cured material has greater adhesion to the toner material and the recording medium than to the surface of the image receptor.

2. The method of claim 1, wherein the radiation is transmitted through the image receptor and onto the toned image layer to cure said radiation curable material.

3. The method of claim 1, wherein a toner image is formed on the image receptor using a dry toner, and the radiation curable material is applied to the dry toner image to form the toned image layer.

4. The method of claim 1, wherein a toner image is formed on the image receptor using a liquid toner and the radiation-curable material is applied to the liquid toner image to form the toned image layer.

5. The method of claim 1, wherein the toned image layer is formed using a liquid toner containing the radiation-curable material.

6. The method of claim 1, wherein the radiation curable material is curable by ultraviolet radiation.

7. The method of claim 1, wherein the radiation curable material is curable by infrared radiation.

8. The method of claim 1, wherein the radiation curable material is curable by visible light.

9. The method of claim 1, wherein the toned image layer is formed on the surface of the image receptor by transferring the toned image layer from a surface supporting the toned image layer.

10. The method of claim 9, wherein said surface supporting the toner image is a photoreceptor.

11. The method of claim 1, wherein the toned image layer is formed on the image receptor by ionography.

12. The method of claim 1, wherein the image receptor comprises a material from the group consisting essentially of a polycarbonate resin, an acrylic resin, Mylar, and a transparency material.

13. The method of claim 7, wherein the image receptor comprises a ground plane.

14. The method of claim 1, wherein the recording medium comprises paper, metal, plastic or glass.

15. The method of claim 1, wherein the surface of the recording medium with the fused image is further modified by post-processing.

16. The method of claim 1, wherein the image to be produced on the recording medium is of single color.

17. The method of claim 1, wherein the image to be produced on the recording medium is multi-colored.

18. The method of claim 17, wherein the toned image layer is multi-colored and fully formed on the image receptor before transferring the toned image layer to the recording medium.

19. The method of claim 17, wherein the image to be produced on the recording medium is multi-colored and each color is separately transferred from the image receptor to the recording medium.

20. The method of claim 19, wherein a color layer is at least partially cured before the next successive color transfer.

21. The method of claim I, wherein the toned image layer on the image receptor is partially cured before contacting the recording medium.

22. An apparatus for transferring and fusing a toned image layer from an image receptor to a recording medium, which apparatus comprises an image receptor comprising a component transparent to radiation for curing a radiation-curable material, means for contacting a recording medium with the image receptor to at least partially transfer a toned image layer from the image receptor to the recording material, wherein said toned image layer comprises a toner material and a radiation-curable material, and a source of radiation for curing said radiation curable material positioned to cure the radiation curable material by passing radiation through the radiation transparent component of the image receptor as the image receptor contacts the recording medium.

23. An apparatus according to claim 12, wherein said radiation source comprises a source of radiation selected from the group consisting of visible light, ultraviolet radiation, and infrared radiation.

24. An apparatus according to claim 22, wherein said image receptor comprises a material selected from the group consisting of an acrylic resin, a polycarbonate resin, a transparency material, and Mylar.

25. An apparatus according to claim 22, wherein said image receptor is in a configuration selected from the group consisting of a web, a belt, a drum, a plate, or a sheet.

26. An apparatus according to claim 22, wherein said image receptor comprises a ground plane.

27. An apparatus according to claim 26, wherein said ground plane comprises a material selected from the group consisting of aluminum, titanium, chromium, and a salt-based material.

* * * * *